(12) United States Patent
Weedlun et al.

(10) Patent No.: US 10,252,502 B2
(45) Date of Patent: Apr. 9, 2019

(54) PROCESS FOR CREATING A SUBLIMATED PRINTED HEAT-SEALABLE APPLIQUE

(71) Applicants: Paul Weedlun, Ellicott City, MD (US); Patricia A. Mason, White Hall, MD (US); Gillian Ross, Ellicott City, MD (US); Owen McGovern, Rockville, MD (US)

(72) Inventors: Paul Weedlun, Ellicott City, MD (US); Patricia A. Mason, White Hall, MD (US); Gillian Ross, Ellicott City, MD (US); Owen McGovern, Rockville, MD (US)

( * ) Notice: Subject to any disclaimer, the term of this patent is extended or adjusted under 35 U.S.C. 154(b) by 0 days.

(21) Appl. No.: 15/592,142

(22) Filed: May 10, 2017

(65) Prior Publication Data

US 2017/0326857 A1 Nov. 16, 2017

Related U.S. Application Data

(60) Provisional application No. 62/334,092, filed on May 10, 2016, provisional application No. 62/435,373, filed on Dec. 16, 2016.

(51) Int. Cl.
| | |
|---|---|
| *B32B 7/12* | (2006.01) |
| *B32B 27/40* | (2006.01) |
| *B32B 5/02* | (2006.01) |
| *B32B 37/12* | (2006.01) |
| *B32B 38/00* | (2006.01) |

(Continued)

(52) U.S. Cl.
CPC .............. *B32B 27/40* (2013.01); *B32B 5/022* (2013.01); *B32B 5/024* (2013.01); *B32B 5/026* (2013.01); *B32B 7/12* (2013.01); *B32B 27/36* (2013.01); *B32B 37/08* (2013.01); *B32B 37/12* (2013.01); *B32B 38/145* (2013.01); *B41M 3/12* (2013.01);

(Continued)

(58) Field of Classification Search
CPC ......... B32B 5/022; B32B 5/024; B32B 5/026; B32B 7/12; B32B 27/36; B32B 27/40; B32B 37/12
See application file for complete search history.

(56) References Cited

U.S. PATENT DOCUMENTS

| 9,701,153 B2 * | 7/2017 | Chiao ..................... B44C 1/172 |
| 2011/0070409 A1 * | 3/2011 | Nishimaki ............. B32B 27/40 |
| | | 428/190 |

(Continued)

*Primary Examiner* — Elizabeth E Mulvaney
(74) *Attorney, Agent, or Firm* — Gordon Feinblatt LLC; Royal W. Craig

(57) ABSTRACT

A process for producing a colorfast thermal appliqué using a polyester knit fabric blank, dye-sublimation printing a graphic image on the fabric blank, and laminating a triple-layer polyurethane adhesive on another side of the printed fabric blank. The triple-layer adhesive comprises a first layer of clear ink resistant polyurethane adhesive followed by a white-pigmented ink resistant polyurethane adhesive and a third clear layer of ink-resistant polyurethane adhesive. The first layer of the triple-layer adhesive is fused under combined temperature and pressure to the polyester blank until said first and second layers impregnates into said fabric blank. The fabric blank is then cut into a discrete finished appliqué that does not substantially change the physical and visual characteristics of a performance fabric substrate to which the appliqué is applied.

21 Claims, 2 Drawing Sheets

(51) Int. Cl.
*B32B 37/08* (2006.01)
*B32B 27/36* (2006.01)
*B41M 3/12* (2006.01)
*D06P 5/28* (2006.01)

(52) U.S. Cl.
CPC ... *B32B 2307/4026* (2013.01); *B32B 2307/41* (2013.01); *D06P 5/004* (2013.01)

(56) References Cited

U.S. PATENT DOCUMENTS

| | | | | |
|---|---|---|---|---|
| 2011/0289647 A1* | 12/2011 | Chiao | ........................ | B32B 7/12 2/69 |
| 2012/0225242 A1* | 9/2012 | Liang | ...................... | B32B 37/12 428/86 |
| 2015/0197113 A1* | 7/2015 | Lee | ........................ | B41M 5/504 442/181 |
| 2016/0174638 A1* | 6/2016 | Kwon | .................... | A41D 27/08 428/353 |

* cited by examiner

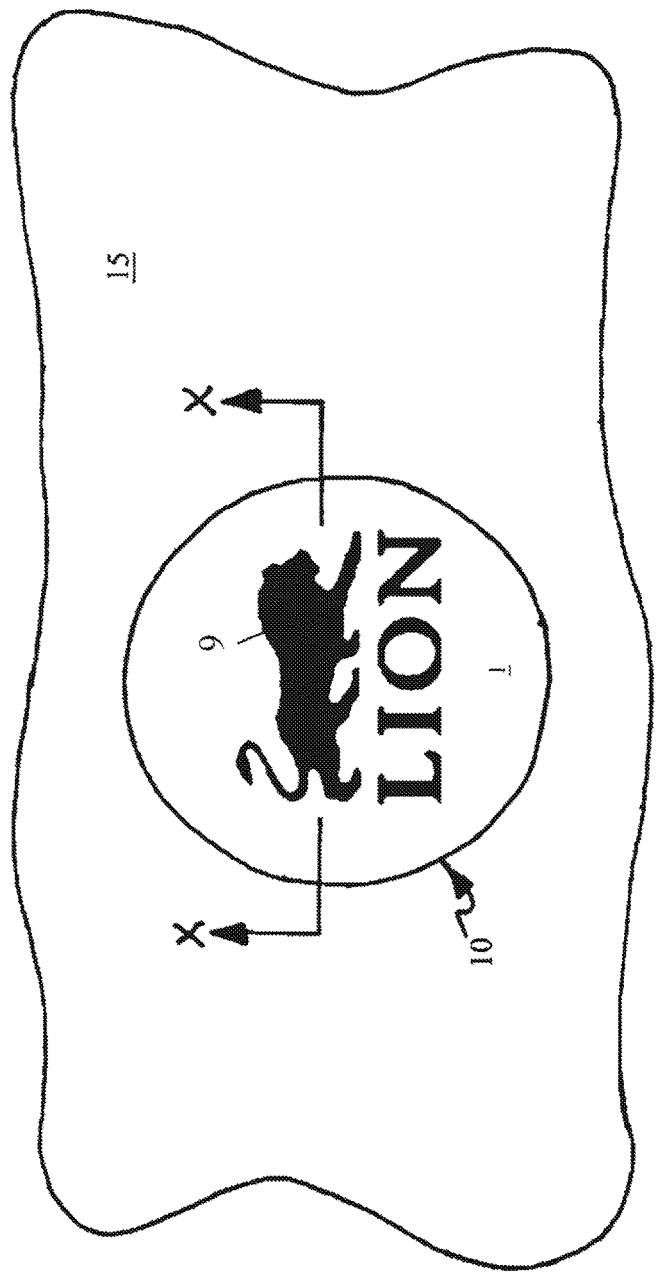
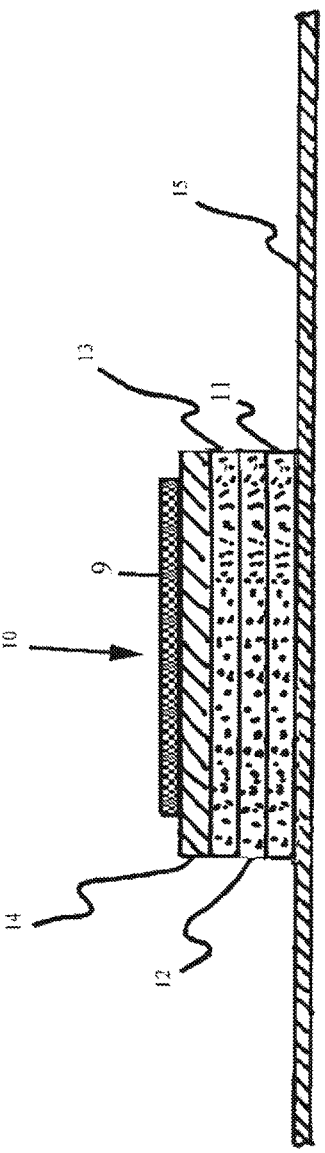
FIG. 1
FIG. 2

PROCESS FOR CREATING A SUBLIMATED PRINTED HEAT-SEALABLE APPLIQUE

CROSS-REFERENCE TO RELATED APPLICATIONS

The present application derives priority from U.S. Provisional Patent Applications 62/435,373 filed 16 Dec. 2016 and 62/334,092 filed 10 May 2016, respectively.

BACKGROUND OF THE INVENTION

1. Field of the Invention

The present invention relates to the creation of heat activated transfers and appliqués and, particularly, to a light-weight sublimation printed heat-transfer comprised of numbers, letters, logos, graphics, and other indicia that retains graphical integrity by inhibiting migration of disperse dyes or ink and/or dye from the transfer or to the transfer from the garment fabric below.

2. Description of the Background

Often "performance garments" are comprised of polyester fabrics that are color-dyed using a sublimation process. The dye sublimation process uses high heat to permanently fuse the colorant into the polyester fabric. For heat setting dye sublimation inks into polyester materials, temperatures in the range of 400° F. (204° C.) with dwell times of approximately 1 minute are typically required. The heat serves two critical functions: first it causes the pores of the polyester fabric to open up, so the material can accept the dye; and second, the heat converts the solid ink dye into a gas for diffusion into the fabric.

Manufacturers of performance apparel, uniforms, swimwear, and sports accessories also use various methods to apply a variety of indicia, such as text, numbers, logos, graphics, and other indicia, to garments and textiles for decoration and identification, among other things. Common application technologies include silk-screening, screen-printing, and sublimated fabric heat activated transfers.

Silk-screening of logos or emblems is commonly used, but this process does not result in a product that withstands repeated stretching, and is complex and time-consuming. In addition, the designs created by silk-screening are flat, lack texture, and do not withstand repeated stretching or industrial or home washings. Consequently, many companies prefer sublimated printed fabric appliqués as their primary method for applying decoration and identification.

Thermally activated adhesive coatings are also used to apply appliqués to garments and textiles. One common type of appliqué, typical of sports jersey and uniform numbering and lettering, is a layered appliqué comprising a solid first base layer that defines a numeral or letter and one or more top layers that are the same shape, but smaller than the layer below it, thereby creating a three dimensional appearance. Typically, each layer is made from dyed fabrics and each additional top layer is stitched to the layer below it. On the back of the solid base layer is a layer of thermally activated adhesive that covers the entire back surface. If the applique is heat-pressed onto an underlying substrate that was pre-colored using dye sublimation the heat can release the dye, causing migration into the applique and discoloration. The thermally activated adhesive can also have filler that can provide opacity to prevent the garment material color showing though the decoration.

An issue that can arise through the use of an opaque adhesive is an opaque adhesive can be visible on the edge of the decoration. Often this visual glue edge is undesirable and causes the appearance of the decoration to be objectionable. The destruction or interference with the characteristics of the underlying fabric is a significant disadvantage, especially in the context of performance apparel with moisture-wicking and/or breathability characteristics, because the appliqué undermines the garment's comfort and performance. In addition to unfavorably changing the physical characteristics of the substrate, these appliqués also change the substrate's visual characteristics, such as the amount of drape. Another problem to overcome particularly in contact sports such as football and hockey is the potential for the garment and appliqués to be pulled causing a sheer which can break the bond between garment and appliqué whether sewn or adhered with an adhesive.

It would be greatly advantageous to provide a light weight heat sealed sublimated printed appliqué that can be applied to any garment or textile without having a loss of graphic caused by dye migration from the appliqué or from the underlying material it is heat applied to. It would also be beneficial if the visual adhesive edge was minimized, to improve overall appliqué appearance whilst providing suitable opacity to prevent show through of the garment material.

SUMMARY OF THE INVENTION

It is, therefore, an object of the present invention to provide a heat sealed appliqué forming indicia such as text, numbers, logos, graphics, and other indicia that does not under normal conditions of use degrade graphically, and would minimize the change the physical characteristics, such as stiffness, pliability, stretch and recovery, weight, or launderability of a performance fabric substrate to which the appliqué is applied.

It is another object of the present invention to provide a heat sealed appliqué that minimizes the change of visual characteristics, such as drape, of the substrate to which the appliqué is applied.

It is another object of the present invention to provide a heat sealed appliqué that prevents show-through of the underlying garment patterns and prevents migration of dyes from the garment fabric to the appliqué.

It is another object of the invention to prevent the migration of the sublimation dyes from the graphic into the backing beneath to avoid color loss or fading.

It is another object of the present invention to provide a heat sealed appliqué that prevents visual adhesive edges around the appliqué through the process of adhesion to the garment.

It is yet another object of the present invention to provide a heat sealed appliqué that resembles a traditional, layered appliqué often used for lettering and numbering on sports jerseys and uniforms.

And it is another object of the present invention to provide a heat sealed appliqué that can be manufactured cost effectively.

According to the present invention, the above-described and other objects are accomplished, by an appliqué comprising a particular woven, nonwoven or knit structure, of polyester fiber composition and cut, the fabric having a thermally activated adhesive coating on one side using multilayer ink resistant polyurethanes or other appropriate thermoplastic adhesive that could be polyester, polyolefin or polyaramid based. The preferred embodiment adhesive coating consists of a clear ink-resistant polyurethane with a melting range between 60-180 deg. C., which is laminated to a second layer of white pigmented ink-resistant polyurethane having a melting range between 80-210 degrees C. Laminated to the second layer is a third clear layer of ink resistant polyurethane with a melting range between 60-180 degrees C., and this third layer is used as the adhesive for securing the appliqué to other products. The appliqué is die-cut or laser-cut from a sublimation printed sheet or roll to a discrete predetermined indicia (text, number, logo, graphic, etc.).

Such an appliqué is manufactured by sublimating printing a graphic on to the appliqué polyester base material. The three layer adhesive is then fused under a temperature and pressure condition required to activate and flow the third layer of adhesive into the printed appliqué media. The printed and laminated material is then cut through using lasers or other mechanical cutting means. The product can then be utilized to decorate apparel or other products by adhering the appliqué on using the clear adhesive layer. This layer is activated at a lower heat and pressure than during lamination of the adhesive to the printed layer.

The result is a decorated garment or item utilizing a polyester fiber material surface with a sublimation printed graphic. The choice of at least two dissimilar ink-resistant polyurethane adhesives in a three layer construction with 1) a clear lower-melt point bonding layer reserved to bond to the appliqué; 2) a pigmented layer used for opacity and as an additional ink migration barrier processed under conditions appropriate to its use and function, and 3) a third clear layer reserved for the purpose of heat-sealing to the apparel or other type of product, which helps maintain the integrity of the printed graphs by inhibiting migration of sublimation inks or disperse dyes in either direction, in conjunction with providing required opacity to prevent show through of garment color and reduced visual edge of the opaque adhesive material. In summary, the applique has a superior visual appearance.

BRIEF DESCRIPTION OF THE DRAWINGS

Other objects, features, and advantages of the present invention will become more apparent from the following detailed description of the preferred embodiments and certain modifications thereof when taken together with the accompanying drawings in which:

FIG. 1 is a top view of an appliqué emblem 10 according to the present invention as applied to apparel.

FIG. 2 is a cross-sectional view of an embodiment of the present invention taken at line x-x of FIG. 1.

DETAILED DESCRIPTION OF THE PREFERRED EMBODIMENT

Figure 3:
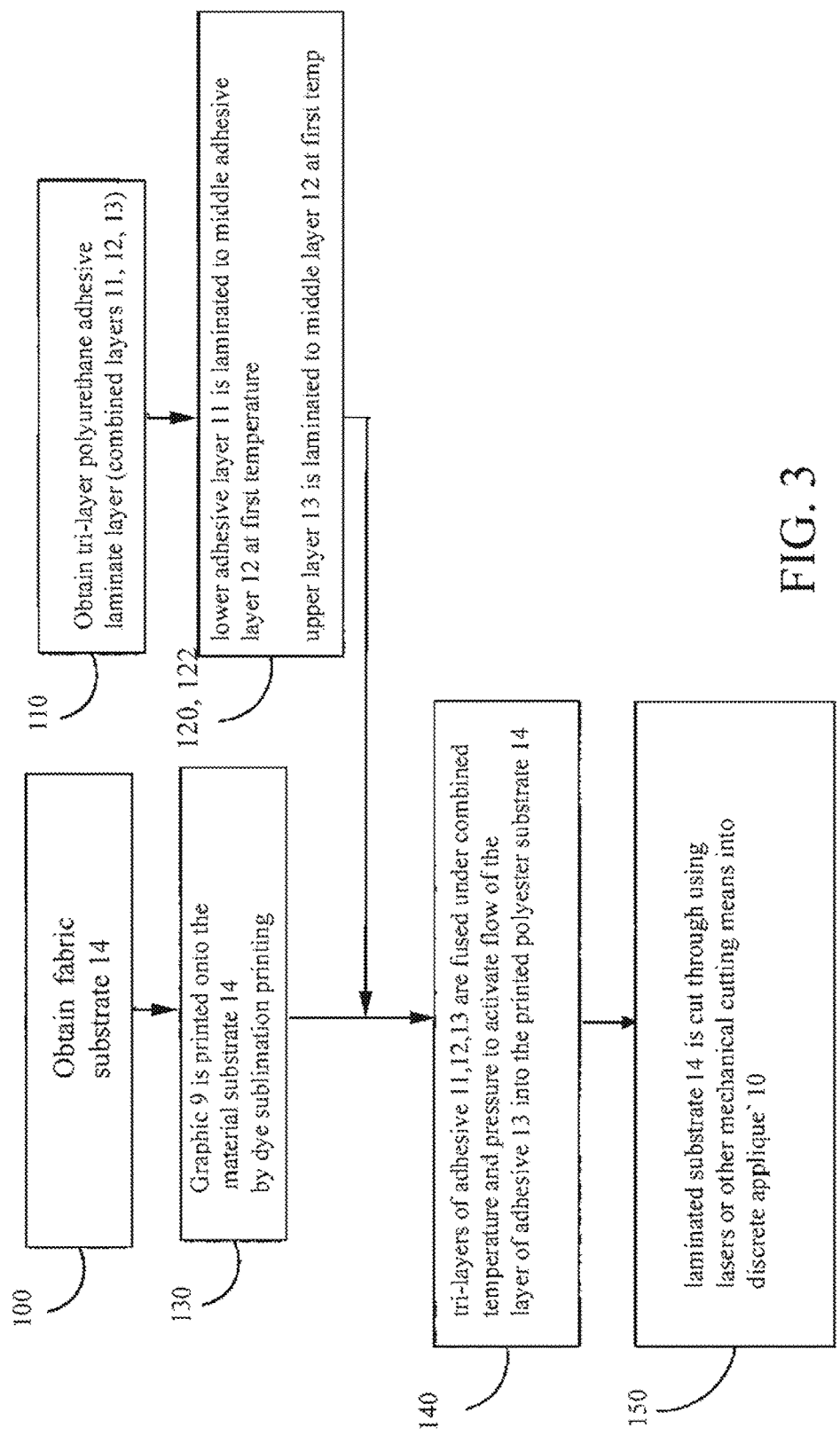
FIG. 3 is a process diagram of the process for creating the appliqué 10 of FIGS. 1-2.

The present invention is a process for producing a lightweight sublimation printed heat-activated appliqué that retains graphical integrity by inhibiting migration of sublimation ink or disperse dye from the transfer or through the transfer from the garment fabric below. The opaque adhesive also prevents show through of the garment fabric whilst providing minimal visual opaque adhesive at the edge of the appliqué. The heat-activated appliqué itself comprises a graphic printed onto the appliqué material with a three layer heat activated adhesive.

With combined reference to FIGS. 1 and 2, the heat activated appliqué 10 of the present invention includes triple heat-activated adhesive layers 11, 12, 13 and an upper appliqué polyester-based fabric layer 14 atop the lower triple adhesive layers 11, 12, 13. The lower heat activated adhesive layer 11 bonds the appliqué 10 to a substrate 15, which may be any fabric or leather substrate. A graphic image 9 is printed atop the fabric layer 14. The graphic 9 may be any decorative image or shape including alpha-numeric characters, logos or images. The graphic 9 can be printed atop the fabric layer 14 by sublimation printing in which a dye is heat transferred into the surface of the fabric layer. The triple adhesive layers 11, 12, 13 collectively inhibit migration of sublimation ink, and or ink or dye to the substrate 15.

In a preferred embodiment the middle adhesive layer 12 comprises a layer of white pigmented ink-resistant polyurethane having a melting point in the range between 80-210 degrees C. The white pigment in middle adhesive layer 12 may be any of titanium dioxide, antimony oxide, zinc oxide, magnesium silicate (talc), calcium sulfate, barium sulfate, zinc borate, anhydrous sodium potassium alumina silicate, calcium sulfate and calcium carbonate, or other pigmenting agents. Both the upper and lower adhesive layers 11, 13 comprise a clear layer of ink resistant polyurethane with a melting point within the range between 60-160 degrees C. The lower adhesive layer 11 is used as the adhesive for securing the appliqué 10 to substrate 15 or other products, while the upper adhesive layer 13 is reserved for securing the fabric layer 14. The middle adhesive layer 12 serves to provide a white opaque layer, the white pigment layer forms a light reflecting layer of suspended insoluble particles with no migration tendency themselves. The thermoplastic in this layer has good resistance to ink migration through it, and high temperature and UV resistance. All three adhesive layers 11, 12, 13 provide a robust migration barrier that inhibits migration of sublimation ink or disperse dyes to the substrate 15, or vice versa.

The appliqué 10 is well-suited for application to any fabric or leather substrate 15, including coarser non-woven fabrics such as felt and fleece ("substrate" being herein defined as any leather or fabric, whether woven fabric or non-woven fabric, or any other flexible material used for apparel, signage, banners, pennants or similar, and "non-woven" being herein defined as any fabric substrate produced by processes other than weaving).

FIG. 3 is a process diagram of the process for creating the appliqué 10 of FIGS. 1-2.

The process begins by obtaining the components therefor at step 100 a fabric blank; and at step 110 a triple-layer polyurethane adhesive laminate layer (combined layers 11, 12, 13). As seen in step 110, the triple-layer polyurethane adhesive laminate is preferably created in advance for ready-made application to the appliqué material 1. One skilled in the art will readily understand that the separate layers 11, 12, 13 may be individually-applied to substrate 15 with the same result, but is more efficient and economical to pre-produce the triple-layer polyurethane adhesive laminate in advance for ready-made application to the appliqué material 1. Pre-production of triple-layer polyurethane adhesive laminate layer (combined layers 11, 12, 13) is accomplished as follows:

At step 120 a lower adhesive layer 11 of clear ink resistant polyurethane is laminated to the white middle adhesive layer 12 at a first temperature preferably within a range of from 60° C. to 160° C., and at step 122 (which may be performed simultaneously) an upper adhesive layer 13 of clear ink resistant polyurethane is laminated to middle adhesive layer 12 at said first temperature. Both upper and lower adhesive layers 11, 13 have a melting range of 60-160 degrees C., and the first temperature is within that range and sufficient to melt the lower and upper adhesive layers 11, 13. This will fuse them to the middle adhesive layer 12, but the temperature is below the melting range of the white middle adhesive layer 12 which melts at a temperature higher than the other adhesive layers. This lower adhesive layer 11 is used as the adhesive for securing the appliqué 10 to substrate 15 or other products, while the upper adhesive layer 13 is reserved for securement to fabric 14. This step 120 effectively forms the composite triple-layer polyurethane adhesive laminate, that it may be sandwiched between sheets of release paper for later use. Upon cooling the result of step 120 is a triple-layer polyurethane adhesive laminate layer comprising combined layers 11, 12 and 13.

Referring back to the substrate 14, at step 130 a graphic 9 is printed onto one side of the appliqué polyester-based material 14 by dye sublimation printing. The use of dye-sublimation printing allows for a nearly infinite variety of graphic or logo options. The sublimation printing provides a durable graphic which can survive the heat application process without degradation of the graphic.

At step 140 the triple-layer polyurethane adhesive laminate produced in step 120 including all layers of adhesive 11, 12, 13 are fused to the printed substrate 14. Upper layer 13 is fused directly to the non-printed side of substrate 14 under a combined temperature and pressure condition sufficient to activate and flow the clear upper layer of adhesive 13 into the appliqué material printed polyester substrate 14. Again, the upper adhesive layer 13 comprises a clear layer of ink resistant polyurethane with a melting point within the range between 60-160 degrees C. and middle adhesive layer 12 comprises a layer of white pigmented ink-resistant polyurethane having a melting point in the range between 80-210 degrees C. with melt point at a second temperature higher than the first temperature, the second temperature being within a range sufficient to melt both the upper and middle adhesive layers 13, 12 and impregnate them into substrate 14 beneath printed image 9.

At step 150 the now-printed and laminated substrate 14 is cut through using lasers or other mechanical cutting means into a discrete appliqué 10. The appliqué 10 can then be utilized to decorate, apparel or other products, by adhering the appliqué 10 using the clear adhesive layer 11, which is activated at a lower heat and pressure than required to melt flow the middle white layer adhesive 12, laminated to the sublimated printed decorated layer 14.

The result is a decorated appliqué 10 utilizing a appliqué polyester fiber substrate material 14 with a sublimation printed graphic 9. The choice of at least two dissimilar ink-resistant polyurethane adhesives arranged in three layers 11, 12, 13, two layers 11, 13 being clear, and one pigmented layer 12 processed under conditions appropriate to its use and function and a clear one 11 reserved for the purpose of heat-sealing to the apparel substrate 15, helps maintain the integrity of the printed graphs by inhibiting migration of sublimation inks or disperse dyes in either direction. This also provides a means of application with reduced visual adhesive edge, whilst still providing the required opacity to prevent garment color show through.

It should now be apparent that the foregoing results in a color-printed and/highlighted appliqué 10 as in FIGS. 1-2 that gives an aesthetically-pleasing embossed or otherwise color-contrasted appearance in a form that is easily applied to a garment or other textile.

We claim:
1. A process for producing a thermal appliqué, comprising the steps of:
   obtaining a fabric blank comprising a woven or non-woven polyester knit material;
   obtaining a triple-layer thermal adhesive laminate comprising a first layer of clear polyurethane adhesive laminated to one side of a second layer of white-pigmented ink resistant polyurethane adhesive, and a third layer of clear polyurethane adhesive laminated to another side of said second layer;
   printing a graphic image on one side of said fabric blank by dye-sublimation printing;
   fusing said triple-layer thermal adhesive laminate by its first layer to said fabric blank under combined temperature and pressure until said first layer impregnates into said fabric blank; and
   cutting said fabric blank into a discrete appliqué.
2. The process for producing a thermal appliqué according to claim 1, wherein a graphic image is printed on one side of said fabric blank.
3. The process for producing a thermal appliqué according to claim 1, wherein said second layer of white-pigmented ink resistant polyurethane adhesive has a melting point higher than both said first and third layers of clear polyurethane adhesive.
4. The process for producing a thermal appliqué according to claim 3, wherein said second layer of white-pigmented ink resistant polyurethane adhesive has a melting point within a range of between 80-210 degrees C.
5. The process for producing a thermal appliqué according to claim 4, wherein said first and third adhesive layers have the same melting point.
6. The process for producing a thermal appliqué according to claim 5, wherein said first and third adhesive layers have the same melting point within the range between 60-160 degrees C.
7. The process for producing a thermal appliqué according to claim 1, wherein said second layer of white-pigmented ink resistant polyurethane adhesive comprises white pigment chosen from among a group consisting of titanium dioxide, antimony oxide, zinc oxide, magnesium silicate (talc), calcium sulfate, barium sulfate, zinc borate, anhydrous sodium potassium alumina silicate, calcium sulfate and calcium carbonate.
8. The process for producing a thermal appliqué according to claim 1, wherein said second layer of white-pigmented ink resistant polyurethane adhesive forms an anti-ink-migration blocking layer.
9. A process for producing a triple-layer thermal adhesive laminate for use with a thermal appliqué, comprising the steps of:
   obtaining a first layer of clear polyurethane adhesive having a melting point at a first temperature;
   obtaining a second layer of clear polyurethane adhesive having a melting point at said first temperature;
   obtaining a third layer of white polyurethane adhesive having a melting point at a second temperature that is higher than said first temperature;
   laminating said first layer and second layer of clear polyurethane adhesive to said third white layer at a temperature equal to or greater than said first temperature but less then said second temperature; and
   cooling to produce a triple-layer polyurethane adhesive laminate.
10. The process for producing a triple-layer thermal adhesive laminate of claim 9, further comprising the steps of:

obtaining a fabric blank comprising a woven or nonwoven polyester knit;

printing a graphic image on one side of said fabric blank by dye-sublimation printing;

fusing triple-layer polyurethane adhesive laminate by its first layer to said fabric blank under combined temperature and pressure until said first and second layers impregnates into said fabric blank; and cutting said fabric blank into a discrete appliqué.

11. A triple-layer thermal adhesive laminate for use in conjunction with a thermal appliqué, comprising:

a layer of white polyurethane adhesive having a melting point at a first temperature;

a layer of clear polyurethane adhesive laminated to one side of said layer of white polyurethane adhesive at a second temperature less than said first temperature; and a layer of clear polyurethane adhesive laminated to another side of said layer of white polyurethane adhesive at said second temperature.

12. The triple-layer thermal adhesive laminate according to claim 11, wherein said first temperature is within a range of between 80-210 degrees C.

13. The triple-layer thermal adhesive laminate according to claim 11, wherein said second temperature is within the range between 60-160 degrees C.

14. The triple-layer thermal adhesive laminate according to claim 11, wherein said layer of white polyurethane adhesive comprises a white pigment chosen from among a group consisting of titanium dioxide, antimony oxide, zinc oxide, magnesium silicate (talc), calcium sulfate, barium sulfate, zinc borate, anhydrous sodium potassium alumina silicate, calcium sulfate and calcium carbonate.

15. The triple layer thermal adhesive laminate according to claim 11 wherein said layer of white polyurethane adhesive is configured as an anti-ink-migration polyurethane.

16. A thermal appliqué, comprising: a fabric patch comprising a woven or non-woven polyester knit having a graphic image on one side of said fabric patch primed by dye-sublimation printing; and the triple-layer thermal adhesive laminate of claim 14 fused to one side of said fabric patch.

17. The thermal appliqué according to claim 16, wherein said layer of white polyurethane adhesive forms an opaque layer reducing show through of the underlying material to which the appliqué is applied.

18. The thermal appliqué according to claim 16, wherein said layer of white polyurethane adhesive forms an opaque layer that reduces visual white adhesive edge as a result of heat and pressure application of the appliqué.

19. The triple layer thermal adhesive laminate according to claim 11, wherein said layer of white polyurethane adhesive comprises thermoplastic polyurethane.

20. The triple layer thermal adhesive laminate according to claim 11, wherein said appliqué material is polyester based.

21. The thermal appliqué according to claim 16, wherein said appliqué is printed using sublimation printing.

* * * * *